B. M. W. HANSON.
CLUTCH ACTUATING MECHANISM.
APPLICATION FILED DEC. 19, 1904.
939,192. Patented Nov. 2, 1909.
5 SHEETS—SHEET 2.
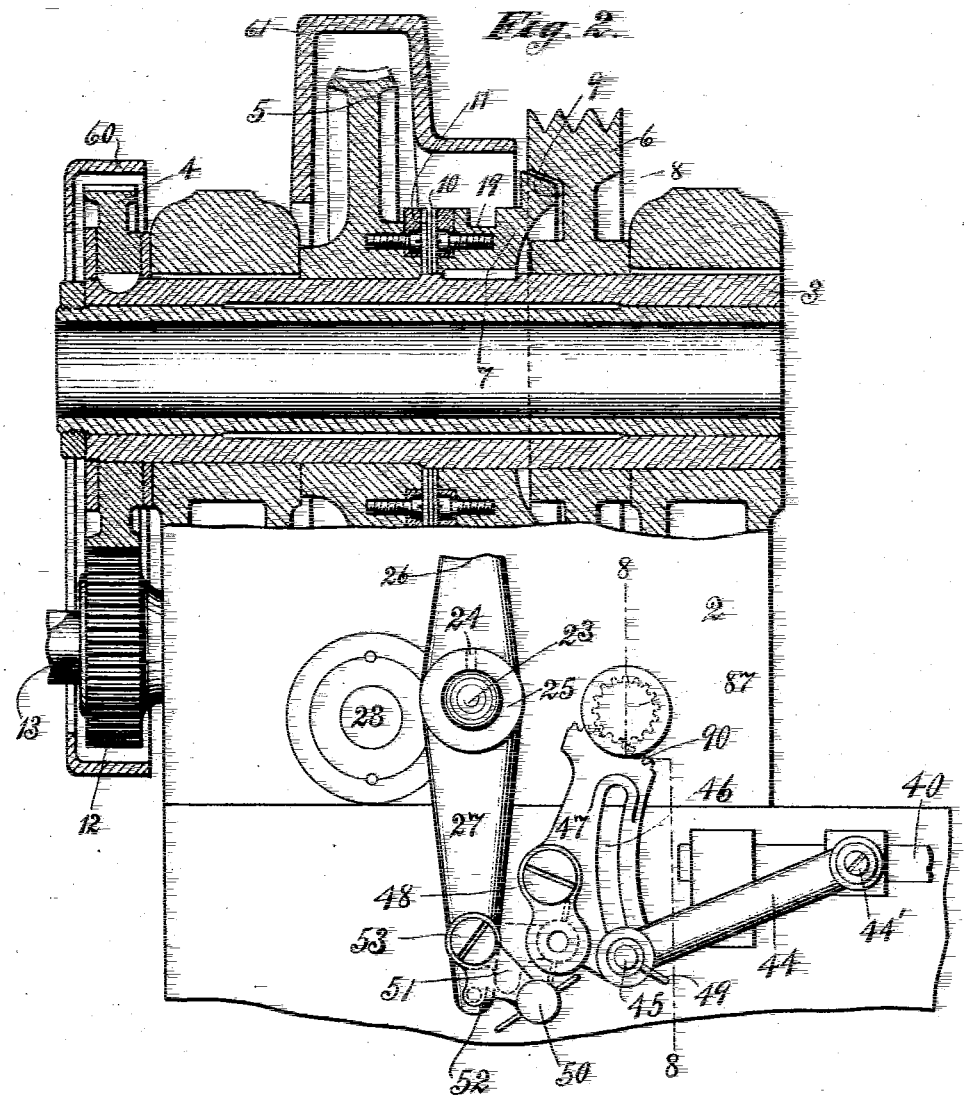
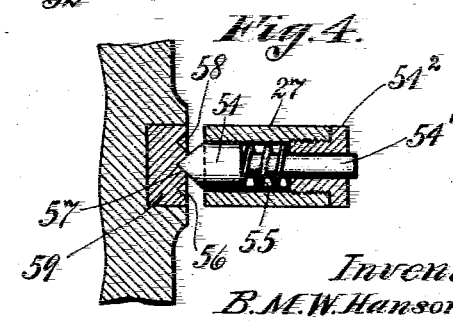
Witnesses:
F. E. Anderson.
Frances E. Blodgett.
Inventor:
B. M. W. Hanson
By his Attorney,
Wm. H. J. Blodgett.

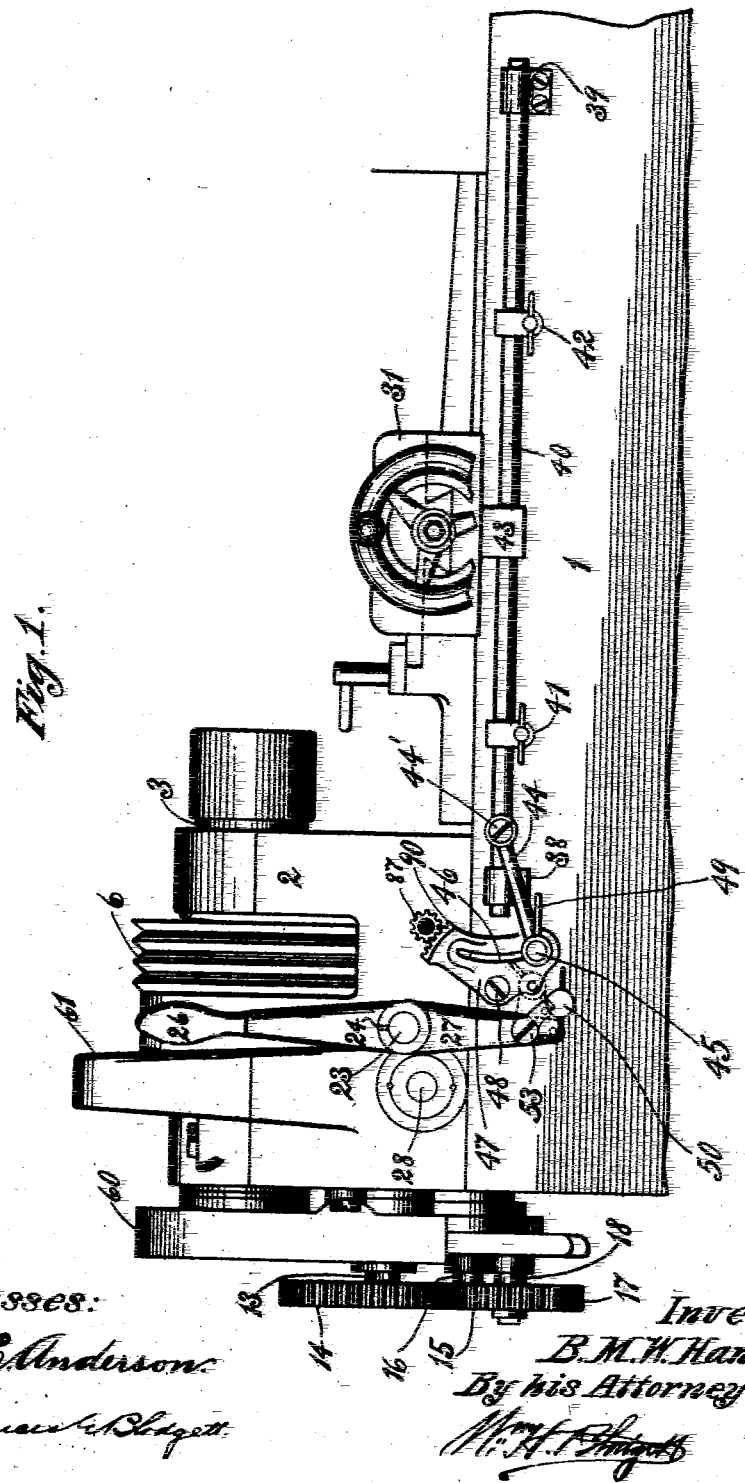

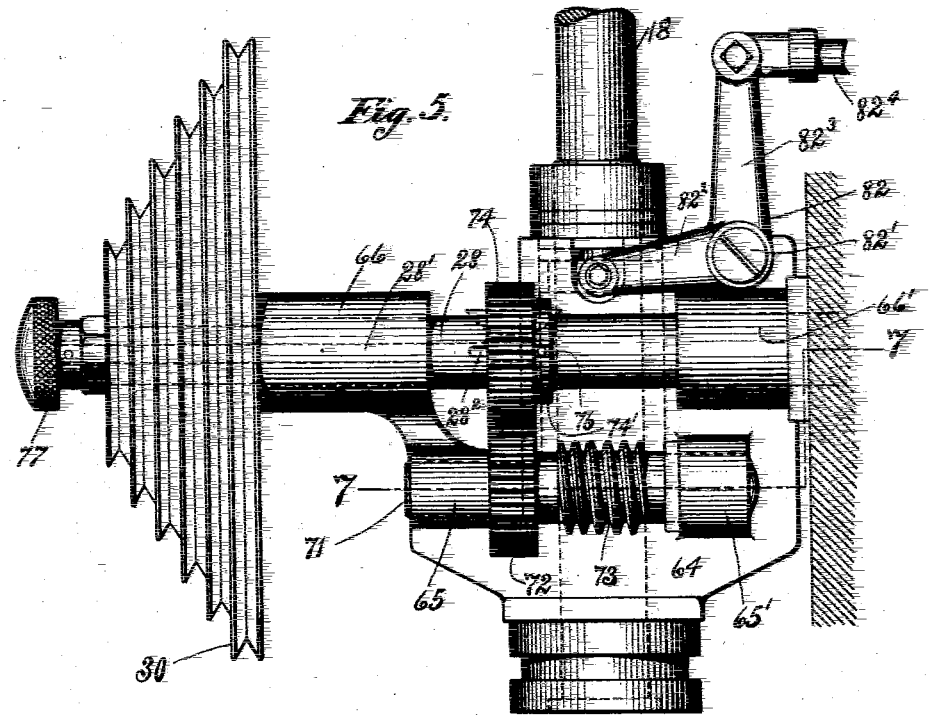
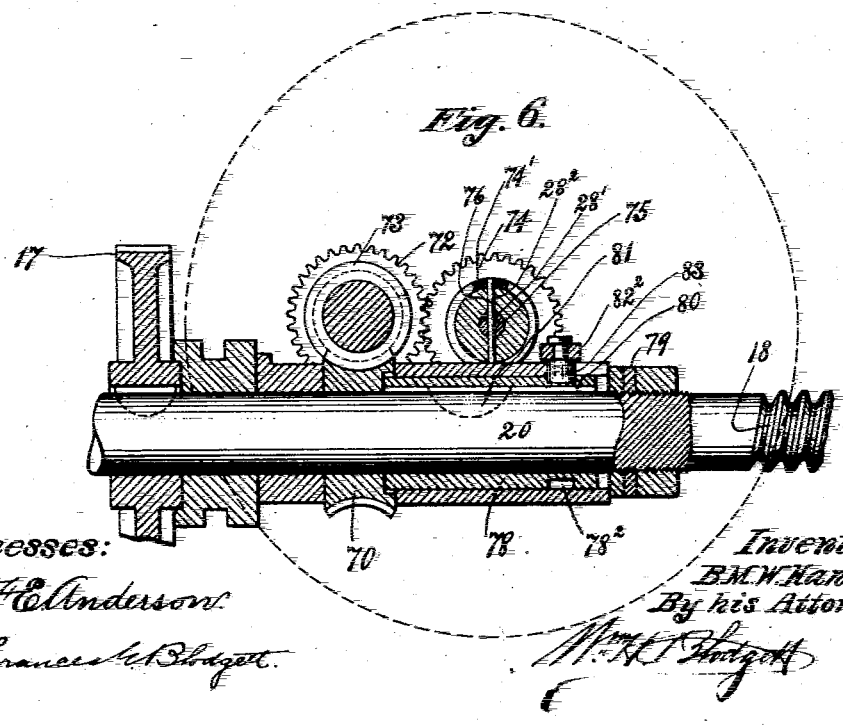

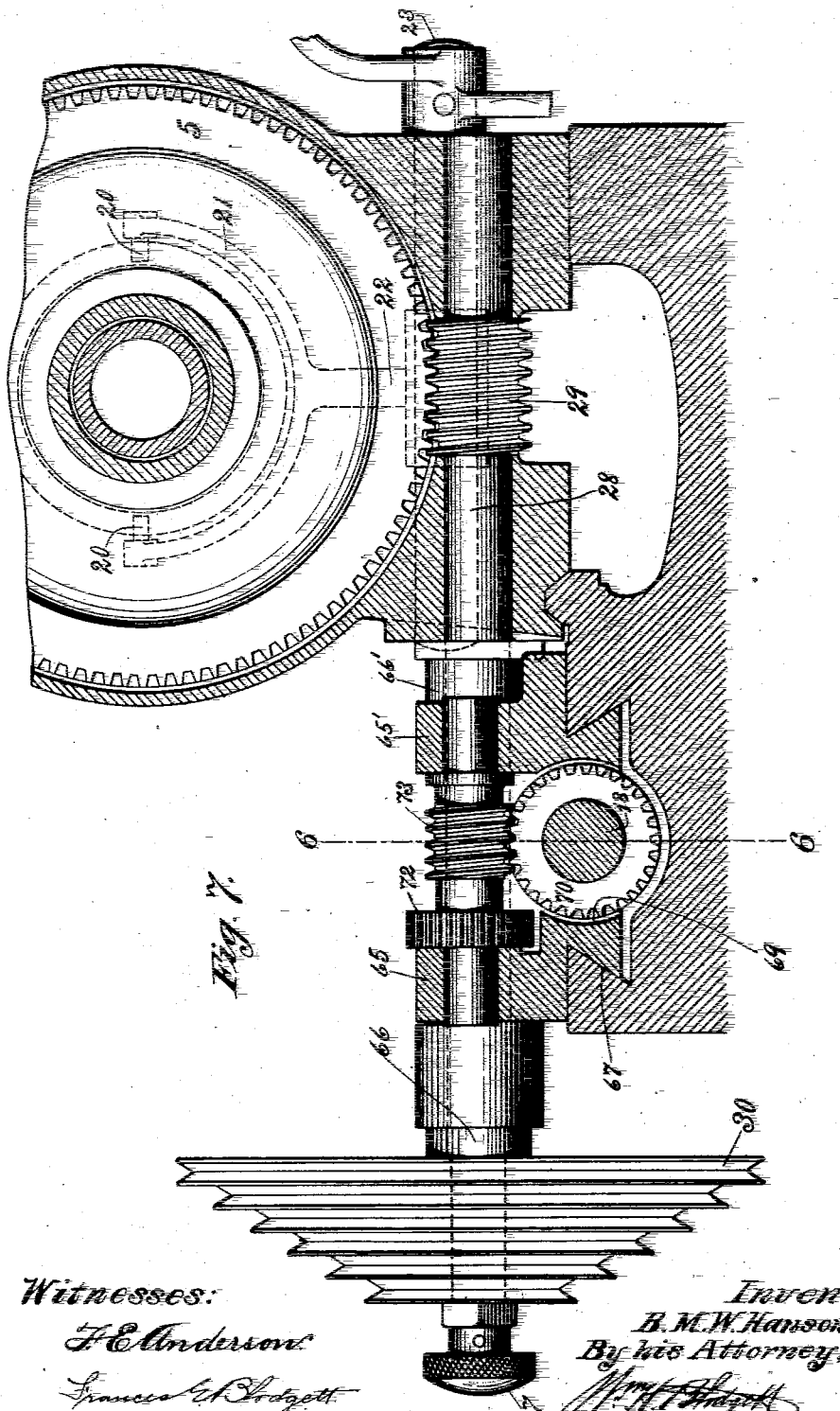

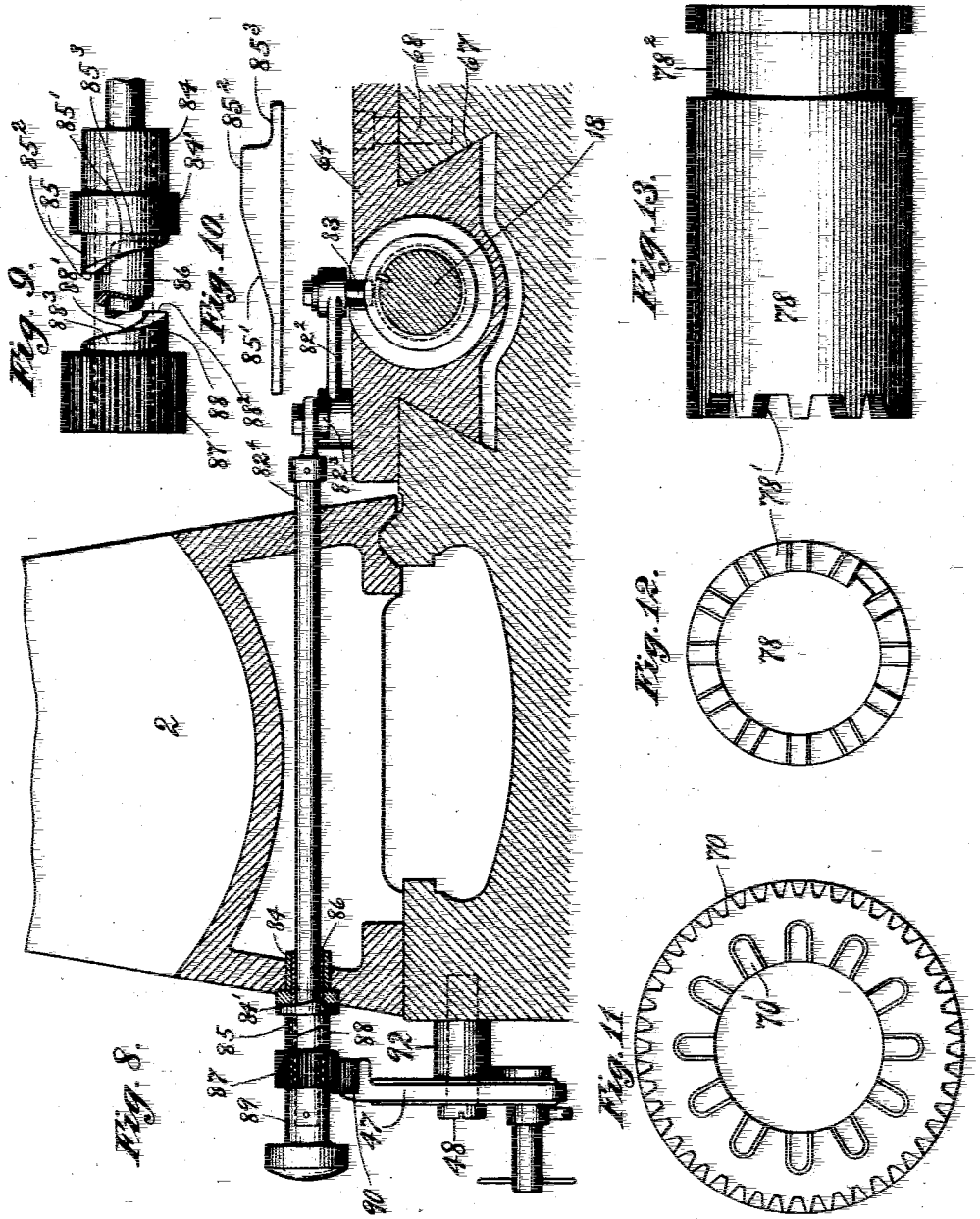

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CLUTCH-ACTUATING MECHANISM.

939,192.  Specification of Letters Patent.  Patented Nov. 2, 1909.

Original application filed February 6, 1903, Serial No. 142,112. Divided and this application filed December 19, 1904. Serial No. 237,544.

*To all whom it may concern:*

Be it known that I, BENGT M. W. HANSON, a citizen of Sweden, residing at Hartford, in the county of Hartford and State of Connecticut, have invented certain new and useful Improvements in Clutch-Actuating Mechanism, of which the following is a specification.

This invention relates to clutch actuating mechanisms, and has for its object the provision of means whereby a spindle may be directly driven by independent mechanism and may through instrumentalities hereinafter described drive a shaft (for instance a lead-screw), whereby mechanism for directly driving the spindle may be disconnected and the spindle may be driven from the shaft or lead-screw.

A further object of the invention is the provision of improved clutch mechanism, as will be hereinafter described.

A further object of the invention is the provision of means for disconnecting the driving mechanism of the spindle from said spindle, and for disconnecting the mechanism for driving the lead-screw shaft, as will be hereinafter set forth.

Other objects of the invention will hereinafter appear.

In the accompanying drawings, Figure 1 is a partial side elevation of a machine with which my invention may be employed, although it is limited to no specific use. Fig. 2 is an elevation in longitudinal, vertical section of part of the mechanism for shifting the clutch. Figs. 3 and 4 are detail views hereinafter described. Fig. 5 is a plan view of mechanism employed for directly driving one of the shafts of the machine; Fig. 6 is a section on line 6, 6 of Fig. 7. Fig. 7 is a transverse section taken on line 7, 7 of Fig. 5. Fig. 8 is a section on line 8, 8 of Fig. 2. Fig. 9 is a detail view of parts hereinafter described. Fig. 10 illustrates one of the cams of the clutch-actuating mechanism. Fig. 11 is an end view of a worm-wheel, showing a clutch surface with which a clutch sleeve hereinafter described coöperates. Fig. 12 is an end view of said clutch sleeve; and Fig. 13 is a side elevation of the clutch-sleeve.

Like numerals designate similar parts throughout the several views.

Referring to the drawings, the numeral 1 designates the frame or bed of a machine with which my invention may be employed. Upon said bed is mounted a head 2 in which is journaled a spindle 3. Keyed to the outer end of said spindle adjacent to its rear bearing is a gear-wheel 4, and loosely mounted on the spindle are a worm-wheel 5 and a grooved-pulley 6 rotated in opposite directions, while splined to the spindle intermediate this worm-wheel and pulley is a clutch 7 having a friction-surface 8 on one side adapted to engage a complemental surface 9 in the pulley 6, and a toothed surface 10 on the opposite side adapted to be thrown into contact with the similar, toothed surface 11 on the worm-wheel 5 as shown in Fig. 2. In mesh with gear 4 is a gear 12 secured to a shaft 13, to the other end of which is keyed a gear 14 in engagement with a pinion 15 mounted on a stud 16,— said pinion driving a gear 17 secured to a shaft 18, which may have a lead-screw, if desired.

In the movable clutch 7 is formed a groove 19 for the reception of pins 20 on the yoke-shaped end 21 of a lever-arm 22 (see Fig. 7) projecting from a rock-shaft 23, extending transversely of the head 2 and journaled in bearings thereof. Sleeved upon this rock-shaft and secured thereto by a pin 24 is a hub 25 from which project, respectively, in opposite directions a hand-lever 26 and a lever-arm 27, said arm 27 being detachably connected to mechanism controlled by a reciprocating carriage hereinafter described.

Located transversely of, and journaled in the head 2 is a shaft 28 carrying a worm-wheel 29, engaging the worm-wheel 5, and secured to an end of said shaft is a conical belt-pulley 30 having a series of grooves of different diameters, so that the desired speed may be imparted to the worm shaft to drive the spindle 3 in the manner required.

Designated by 31 is a slide or carriage mounted for reciprocatory movement upon the bed 1, and carrying a nut of any suitable kind with which the threads of the screw 18 engage.

In brackets 38 and 39 secured to the bed 1 is mounted a shifting-rod 40 carrying adjustable stops 41 and 42 of any suitable kind, said stops coöperating with a lug 43 depending from the carriage, as shown in Fig. 1. Articulated to the shifting-rod 40 at 44' is a link 44 having a wrist-pin 45 fitted in a curved slot 46 of a lever 47 pivoted at 48 to the frame. A lever-screw 49 serves to retain this wrist-pin when set at any desired place in the slot. Secured by a screw 50 to the lower part of lever 47 is a link 51 having a wing or extension 52, said link being connected to the lever-arm 27 by a screw 53, and being shown in normal position, when the lead-screw is driven from the live-spindle, by dotted lines in Figs. 1 and 2. Fitted in a bore in the lower end of lever-arm 27 is a conical detent 54 having a shank 54' passing through a screw 54², and between the end of said screw and the head of the detent is a spring 55 which presses said detent inward to cause its nose to engage any one of a series of notches 56, 57, and 58, respectively, in a plate 59 located in a recess of the frame,—as shown in Fig. 4. When the clutch 7 is thrown into engagement with belt-pulley 6 arm 27 is shifted to the left, and the detent snaps into notch 56; when shifted to engage worm-wheel 5, said lever-arm is moved to the right and the detent engages notch 58; and when said clutch is thrown to a neutral position the detent holds the parts in positions shown in Fig. 2, and the worm-wheel 5 and pulley 9 revolve idly upon the spindle 3. This slotted lever 47 and the parts connecting it with the lever-arm 27 and shifting-rod 40 constitute a "link-motion" for shifting the clutch to a neutral position at the limit of each stroke of the carriage, hence stopping the movement of said carriage.

For protecting the gears 4 and 12 and clutch 10 hoods 60 and 61 may be employed, if desired.

In the operation of my improved machine as thus far described the lead-screw is driven from the live-spindle 3, and the machine is set in motion by grasping lever 26 and shifting the clutch 10 into contact with the toothed surface 11 of worm-wheel 5, thus connecting said wheel to the spindle and through the gearing described actuating the lead-screw 18, which, engaging the nut of the carriage, will cause said carriage slowly to advance from right to left in the illustration Fig. 1, until the lug 43 comes into contact with the stop 41, shifts the rod 40, and, through the "link-motion" and connections described, throws the clutch out of engagement with worm-wheel 5 and to the neutral position illustrated in Fig. 3, thus stopping the carriage. If it is desired to reverse the carriage the clutch is then shifted by the means described to throw it into contact with belt-pulley 6 which rotates at a greater speed than worm-wheel 5, thus connecting said pulley to the spindle 3, and through the gear-train set forth, rapidly rotating the lead-screw and causing the carriage to return quickly until the lug 43 strikes stop 42 and again shifts the rod 40 to throw the clutch to its neutral position.

As thus far described the machine is similar to that set forth in my application filed July 12, 1902, Ser. No. 115,337 in which the screw is driven from the spindle, and no claim is herein made to the parts of said machine except as they coact with other elements to be hereinafter set forth.

When it is desirable to drive the screw directly and to actuate the live spindle from said screw, lever 26 is manipulated to throw the clutch 10 to its neutral position, the detent 54 then snapping into the central notch 57 of plate 59, as shown in Fig. 4. Screw 50 is then withdrawn from its seat in lever-arm 47, and the link 51 is swung downward until its lug 52 covers the stem 54' of the detent 54, thereby locking said detent against accidental displacement, as illustrated by full lines in Fig. 2. Power is now applied to pulley 30 on shaft 28, which by its worm 29 causes the worm-wheel 5—now loose on the live-spindle—to rotate idly without imparting motion to said spindle.

Designated by 64 is a slide or carriage provided with bearings 65, 65' and 66, 66'. This slide is fitted in a guideway 67 of the bed, and is secured, after it has been properly adjusted, by means of a screw or equivalent device 68, shown by dotted lines in Fig. 8, and it is provided with a longitudinal passage 69 for the reception of the lead-screw 18, a worm-wheel 70 and a clutch hereinafter described.

Journaled in the bearings 65, 65' is a shaft 71 carrying a pinion 72 and a worm 73, the latter engaging the worm-wheel 70, while the shaft 28 passes through the bearings 66 and 66', said shaft having a longitudinal bore 28' and a slot 28² communicating with said bore. Mounted for sliding movement on said shaft 28 is a pinion 74, and located in the bore 28' is a rod 75 connected by a pin 76 passing through the slot 28² to the hub 74' of the pinion as shown in Figs. 5 and 6, said rod having at its outer end a knob or handle 77 by means of which it may be manipulated to throw the pinion either into or out of gear with the pinion 72 of the worm-shaft 71.

In the passage 69 of carriage 64 is mounted a clutch-sleeve 78 having teeth 78' at one end and a groove 78² adjacent to its opposite extremity, said clutch-sleeve surrounding and being movable upon the lead-screw shaft 20, and being limited in its play by collars and washers 79, as shown in Fig. 6. In the inner face of the worm-wheel 70 are formed recesses 70' with the walls of which the teeth 78' are adapted to engage when the clutch-sleeve is shifted. This clutch-sleeve is grooved at 80 to fit over a key 81 which connects it to rotate with the lead-screw shaft, but permits of its movement toward and from the worm-wheel. For actuating this clutch-sleeve any suitable means may be employed, and I have found useful for this purpose a bell-crank lever 82 pivoted to the carriage 64, at 82' one arm 82² of which lever carries a pin or roller 83, entering the circumferential groove 78² in said sleeve and the other arm 82³ of which is articulated to a rod 82⁴ passing through the head-stock 2 as shown in Fig. 8.

Mounted in the side of the head-stock 2 is a tubular bushing 84 having a flange 84' from which projects a cam 85 having a spiral face. A development of this cam is illustrated in Fig. 10 and, as shown by said figure and by Fig. 9, it is provided with a spiral, gradually-rising surface 85' terminating in a straight portion 85² and then abruptly dropping to a flat locking-part 85³.

Driven into the bore of bushing 84 is a sleeve 86, and upon this sleeve is mounted a pinion 87 having projecting from it a cam-hub 88 provided with a spiral, gradually rising end portion 88', terminating in a straight part 88² and then like the complemental cam, 85, abruptly descending to a flat locking surface 88³, shown by dotted lines in Fig. 9.

To the end of rod 82⁴ is keyed the hub of a knob or push-button 89, in virtue of which the rod 82⁴ may be actuated by hand to shift the clutch 78 when desired, and the pinion 87 may also be actuated in the same manner to throw the cam-surfaces into their locked position.

As illustrated in Figs. 1, 2 and 8 the pivoted lever 47 is provided, preferably on its upper surface, with a rack 90 in engagement with the pinion 87, and said pivoted lever is mounted for swinging movement upon bolt 48 projecting from the frame and is spaced at the proper distance from said frame by a short sleeve 92.

When it is desired to drive the lead-screw or shaft 18 directly and the live spindle from said screw, power is applied to shaft 28 by belting on pulley 30, and knob 77 is grasped and pushed inward to cause rod 28' to slide pinion 74 into mesh with pinion 72 of shaft 71 carrying the worm 73, thereby causing said worm to drive the worm-wheel 70 which is now connected to the lead-screw shaft 20 by the clutch 78, as shown in Fig. 6. When this action has been accomplished the carriage 32 has been adjusted to the right and the lead-screw now advances at the speed required, and through the gearing 17, 15, 14, 12 and 4, drives the live-spindle 3, thus rotating the same and traversing the carriage until the lug 43 strikes stop 41 and through the rod 40, link 44 and lever 47 and its rack 90 actuates the pinion 87 and causes the cam 88 to rotate against the stationary cam 85 and thus draw back the rod 82⁴ to shift the lever 82, and through it the clutch 78 out of engagement with the clutch-face of the worm 79, thereby stopping the motion of the lead-screw and the gears connecting the same with the live-spindle.

Changes may be made in the location and arrangement of the parts, and other means may be employed for driving the lead-screw directly and for connecting it with the live-spindle. Clutches different from those shown may also be employed, and the means for actuating the clutch, gear and other elements of the machine may be modified without departure from the invention.

This application is a division of my case filed Feb. 6, 1903, Serial No. 142,112, patented Feb. 14, 1905, No. 782,237, and no claims are made herein to the metal-working machine covered by said case.

Having thus described my invention what I claim is—

1. The combination with a driven element, of gearing for actuating said element; a clutch for connecting a member of said gearing to the driven element; a movable rack; means for actuating said rack; a pinion in engagement with the rack; a cam actuated by the pinion; and means for connecting said cam with the clutch.

2. The combination with a driven element, of gearing for actuating said element; a clutch for connecting a member of said gearing to said element; a pivoted rack; means for actuating said rack; cam-mechanism actuated by the rack; and means controlled by said cam-mechanism for shifting the clutch.

3. The combination with a shaft, of a worm-wheel loose on the shaft; means for connecting the worm-wheel to the shaft; a pinion on the worm-shaft; a slotted shaft having a bore; a pinion on said slotted shaft; a pin passing through the hub of the pinion and the slot of the shaft; a rod located in the bore of the shaft, said rod having a knob; and means for rotating the slotted shaft.

4. The combination with a clutch of a lever having a rack; means for actuating the lever; a pinion having a cam actuated by the rack; a stationary cam in engagement with the pinion-cam; a rod actuated by the pinion-cam; and means for connecting said rod with the clutch.

5. The combination with a spindle, of reversely-driven elements loose on the spindle; a clutch in sliding connection with the spindle and adapted to connect either of said reversely-driven elements thereto or to be thrown to a neutral position; a lever for actuating the clutch; a notched plate; a detent carried by the lever and adapted to engage the notches of the plate; and a device carried by the lever and movable over the detent to lock the same in position.

6. The combination with a clutch, of a lever for shifting the clutch; a detent mounted in an arm of the lever; framework having notches with which the detent is adapted to engage; and a link pivoted to said arm of the lever, and having a projection for locking the detent against movement.

7. The combination with a carriage, of a screw for actuating said carriage; a gear loose on the screw-shaft; a clutch in sliding engagement with said shaft; means for throwing the clutch into engagement with said gear; a shifting rod; an adjustable stop on said shifting-rod; a device on the carriage adapted to engage said stop; a pivoted lever having a slot extending on both sides of the fulcrum of said lever; a link connected to said lever and to the shifting-rod, the connection of the link being movable in the slot; means for clamping the link when adjusted in the slot of said lever; and means actuated by the lever for shifting the clutch out of engagement with the gear on the screw-shaft.

8. The combination with a carriage, of a screw for actuating said carriage; gearing for driving the screw directly; a spindle; gearing connecting the screw and spindle; a shifting-rod; stops adjustably secured to said shifting-rod; a clutch in the gearing for driving the screw directly; a pivoted lever having a slot extending both sides of the fulcrum of said lever; a rack carried by said lever; a link adjustable in the slot to either end thereof, and connecting the lever and the shifting-rod; and means actuated by the lever for shifting the clutch.

9. The combination with a clutch, of a pivoted lever having a rack; a pinion engaging said rack and having a cam; means for actuating said pinion; a stationary cam; and means for connecting the pinion-cam with the clutch.

10. The combination with a pivoted lever having a slot extending on both sides of the fulcrum of said lever, of a link having a wrist-pin fitted in the slot and movable to either end thereof; means for actuating the link; a clutch; and means controlled by the lever for shifting said clutch.

11. A clutch shifting device comprising a pivoted lever having a slot extending on both sides of the fulcrum of said lever; a rack carried by said lever; a device adjustable in the slot to either end thereof; means for actuating said device; a clutch; and means actuated by said rack for shifting the clutch.

12. The combination with a spindle, of reversely-driven elements loose thereon; a clutch intermediate said reversely-driven elements; a lever for shipping said clutch; an arm projecting from said lever; a detent carried by the arm; a device with which the detent engages; a pivoted lever; means for connecting said lever to the arm; and means for actuating the pivoted lever.

In testimony whereof I affix my signature in presence of two witnesses.

BENGT M. W. HANSON.

Witnesses:
   F. E. ANDERSON,
   F. E. BLODGETT.